United States Patent
Metzger

[15] 3,664,202
[45] May 23, 1972

[54] APPARATUS FOR THE TRANSMISSION OF A ROTARY MOVEMENT THROUGH THE WALL OF A CHAMBER UNDER PRESSURE

[72] Inventor: Reinhold Metzger, Kilianstadten, Germany
[73] Assignee: VDO Tachometer Werke Adolf Schindling GmbH, Frankurt, Germany
[22] Filed: May 18, 1970
[21] Appl. No.: 38,210

[30] Foreign Application Priority Data

May 31, 1969 Germany....................P 19 278 42.3

[52] U.S. Cl............................................74/18.1, 267/154
[51] Int. Cl........................................................F16j 15/50
[58] Field of Search....................74/17.8, 18, 18.1; 267/154

[56] References Cited

UNITED STATES PATENTS 1,966,537  7/1934  Binckley....................................74/18
3,390,546  7/1968  Jewell................................267/154 X

FOREIGN PATENTS OR APPLICATIONS 1,218,864  5/1960  France........................................74/18

Primary Examiner—Meyer Perlin
Assistant Examiner—F. D. Shoemaker
Attorney—Ernest G. Montague

[57] ABSTRACT

An apparatus for the transmission of an oscillatory movement through the wall of a chamber under pressure, comprising a torsion tube having one open end and secured pressure tight in a corresponding recess of a wall and the other end being closed up pressure tight. A shaft is disposed concentrically in the torsion tube and is secured to the closed tube end, and the torsion tube is formed over its entire outer surface with a plurality of cavities with a small opening face and reduces locally the wall thickness of the tube.

7 Claims, 4 Drawing Figures

PATENTED MAY 23 1972 3,664,202

INVENTOR
REINHOLD METZGER
BY
ATTORNEY.

APPARATUS FOR THE TRANSMISSION OF A ROTARY MOVEMENT THROUGH THE WALL OF A CHAMBER UNDER PRESSURE

The present invention relates to an apparatus for the transmission of an oscillatory movement through the wall of a chamber under pressure, in general, and to such apparatus permitting leading through for a differential manometer device, in particular, with a torsion tube, one end of which is opened and is secured pressure tight in a corresponding cavity of the wall and the other end of which is closed pressure tight, and further with a shaft, which is disposed concentrically in the torsion tube and on the closed tube end.

Such an apparatus is used mostly in differential manometer devices for the transmission of the differential pressure-dependent deviation of the pressure element from one of the two pressure chambers outwardly onto the dial of the differential manometer device, which is directly or indirectly connected with the shaft, yet by example, also in liquid level measuring devices for the transmission of the liquid level-dependent swimmer lift from a pressure vessel containing a liquid. These devices have the advantage that with the latter, the sealing difficulties occurring in devices with a packing relative to the starting pressure and the problem of the possible friction-free mounting of the transmission membrane can be circumvented. The dimensioning of the torsion tube present in these devices takes place substantially in accordance with two criteria: The occurrence of static pressure which has to be taken up by the tube and the desired torsion capacity of the tube. Accordingly, either short thin walled tubes with a small inner diameter or long thick walled tubes with a larger inner diameter are used, which measure brings about, that the shaft has either, likewise, a small diameter or a relatively large length, so that in both instances, only relatively low torques are transmitted by means of the shaft. It has been proposed before also, by example, in a differential manometer device to provide the transmission of the differential dependent deviation of the pressure element from one of the two pressure chambers by means of a tube sealing body subject to bending or a membrane subject to bending, which sits in a wall opening of one of the pressure chambers and in which a lever is mounted connecting the pressure element with the dial. It is of a disadvantage that such devices are pressure-sensitive, since the pivot point of the lever disposed in the tube sealing body or in the membrane displaces, depending upon the height of the pressure prevailing in the pressure chamber. If, however, for the reduction of this pressure-sensitivity, the membrane or the tube sealing body is designed correspondingly as resistance against bending, the sensitivity of the device is appreciably reduced. Finally, the likewise already proposed magnetically operated transmission devices have the drawback, that they are expensive, complicated in construction and temperature sensitive, so that they can be used to a limited extent only.

It is one object of the present invention to provide an apparatus for the transmission of a rotary movement through the wall of a chamber under pressure, wherein the difficulties and drawbacks of the known devices are avoided.

It is another object of the present invention to provide an apparatus for the transmission of a rotary movement through the wall of a chamber under pressure, wherein the torsion tube has over its entire outer surface, preferably equally distributed thereover, a plurality of cavities, which locally reduce the tube thickness, which cavities have a small opening face. Such a torsion tube can now be dimensioned with respect to all dimensions exclusively, in accordance with the requirements of the static pressure, thus, by example, with a relatively large inner diameter in case of a median wall thickness and with a short tube length, since the desired capacity of assuming a torsion is settable by the number, the depth and shape of the cavities due to the small opening faces of the cavities independently of the static pressure. This arrangement brings about, that the diameter of the shaft is chosen relatively large and short, and thus a large torque can be transmitted by means of the shaft. Beyond that, the apparatus of the present invention has the advantage, that if it is used for a measuring-differential manometer-device, liquid level measuring instruments, etc., the setting of the measuring range which took place until now by means of return springs, which were effective in the chamber under pressure and on the measuring element, as the blade spring, swimmer, etc., can now be performed by means of return springs disposed outside of the chamber under pressure and effective on the shaft.

The form of the cavities can be chosen within wide ranges nearly without limitation, and likewise, their arrangement relative to each other. Particularly favorable results are obtained in connection with an equal distribution of the torsion forces in the tube, if the cavities are set-off relative to each other in the axial direction. For the same reasons, it is advisable to provide cavities with small rectangular openings in the tube, the longitudinal axes of the rectangular openings being aligned substantially parallel to the axis of the tube.

The production of the cavities takes place more suitably by means of an etching process, particularly since the cavities which locally reduce the wall strength of the tube extend generally only over a small part of the total wall strength of the tube. Likewise it is also possible to reduce the cavities in a single chip removing working step. In particular in case of such production of the cavities, an embodiment is preferable, in which the cavities extend over the entire wall strength of the tube and the inner and/or outer- surface of the tube is equipped with a layer, preferably of synthetic material or a synthetic resin for the production of the required pressure tightness, since thereby an appreciably simpler production results as compared with cavities extending only over a part of the wall strength.

With these and other objects in view, which will become apparent in the following detailed description, the present invention, which is disclosed by example only, will be clearly understood in connection with the accompanying drawing, in which.

Figure 1:
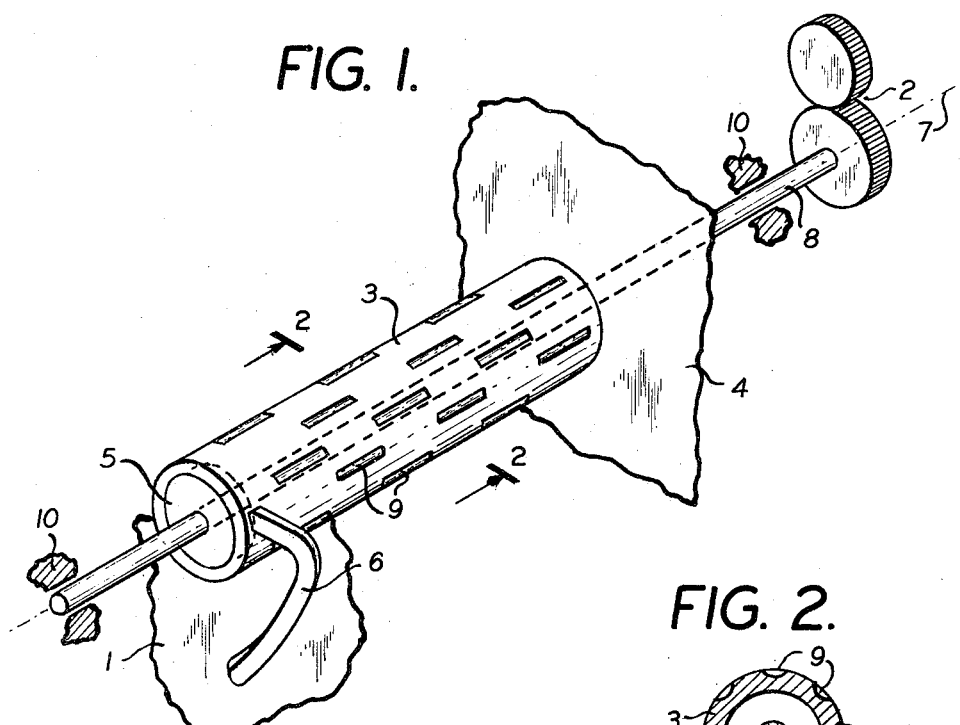
FIG. 1 is a perspective view of one embodiment of a differential manometer device.
Figure 2:
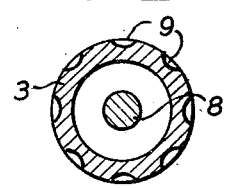
FIG. 2 is a section along the lines 2—2 of FIG. 1.

Referring now to the drawing, and in particular to FIGS. 1 and 2, the apparatus for transmission of the deviation of a membrane 1 of the differential manometer device from one of the two pressure chambers to the dial operating means 2 comprises a torsion tube 3, which is secured with its open end in a corresponding recess of the pressure chamber wall 4. The other end of the torsion tube 3 is tightly closed by a stopper 5. On the end which is closed with the stopper 5 there is disposed a lever 6, the free end of which engages against the membrane 1. In case of a deviation of the membrane, this lever 6 swings about the axis 7 of the torsion tube 3, whereby the torsion tube 3 performs a torsion movement and the shaft 8 secured concentrically in the stopper 5 is rotated. The desired torsion capacity of the torsion tube 3 is produced by means of a plurality of cavities 9 reducing locally the wall strength of the tube with a small opening face, which cavities 9 are equally distributed over the entire outer surface of the torsion tube 3. The cavities having small rectangular openings are aligned with their longitudinal axes substantially parallel to the axis 7 of the tube and are set-off relative to each other in peripheral direction of the tube. As can be ascertained particularly from FIG.2, the cavities 9 extend only over a portion of the total wall strength of the torsion tube 3. For the prevention of a radial deviation of the shaft and of the torsion tube 3, which could influence the transmission of the oscillatory movement, bearings 10 are provided.

Figure 4:
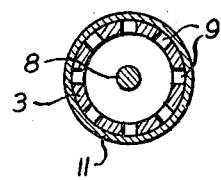
FIG. 4 is a section along the lines 4—4 of FIG. 3.
Figure 3:
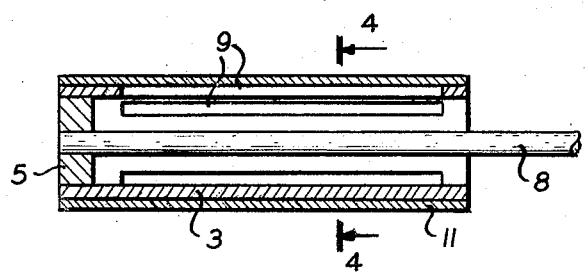
FIG. 3 is an axial section through another embodiment of the torsion tube.

Referring now again to the drawings, and in particular to FIGS. 3 and 4, a torsion tube 3 is disclosed in which the cavities 9 extend over the entire wall strength of the tube and the outer surface of the tube 3 is equipped with a layer 11 of synthetic resin for the production of the required pressure tightness. The cavities 9 are in the present embodiment slots, which extend over nearly the total length of the torsion tube 3, which brings about the advantage, that the slots can be produced simply in a single chip removing working step.

While I have disclosed several embodiments of the present invention, it is to be understood that these embodiments are given by example only and not in a limiting sense.

I claim:

1. An apparatus for the transmission of a rotary movement through the wall of a chamber under pressure, in particular the lead through for a differential manometer device, comprising
    a torsion tube having one open end and secured pressure tight in a corresponding recess of a wall,
    a closed tube end means for closing up the other end of said tube pressure tight,
    a shaft disposed concentrically in said torsion tube and secured to said closed tube end means, and
    said torsion tube being formed over substantially its entire outer surface with a plurality of cavities with a small opening face and locally reducing the wall thickness of said tube.

2. The apparatus, as set forth in claim 1, wherein said cavities are set off relative to each other in the direction of the periphery of said tube.

3. The apparatus, as set forth in claim 1, wherein
    said cavities comprise narrow rectangular openings, and
    the longitudinal axes of said rectangular openings are aligned substantially parallel to the longitudinal axis of said tube.

4. The apparatus, as set forth in claim 1, wherein
    said cavities extend over the entire wall thickness of said tube,
    said tube has an inner face and an outer face, and
    at least one of said faces is equipped with a layer of synthetic material for production of the required pressure tightness.

5. The apparatus, as set forth in claim 4, wherein said synthetic material comprises synthetic resin.

6. The apparatus, as set forth in claim 1, wherein said cavities are equally distributed over said surface of said tube.

7. The apparatus, as set forth in claim 1, wherein said cavities constitute etched cavities.

* * * * *